8208X
Sheet 1 - 3 Sheets.
J. Haight.
Loom.
Patented May 17, 1834.
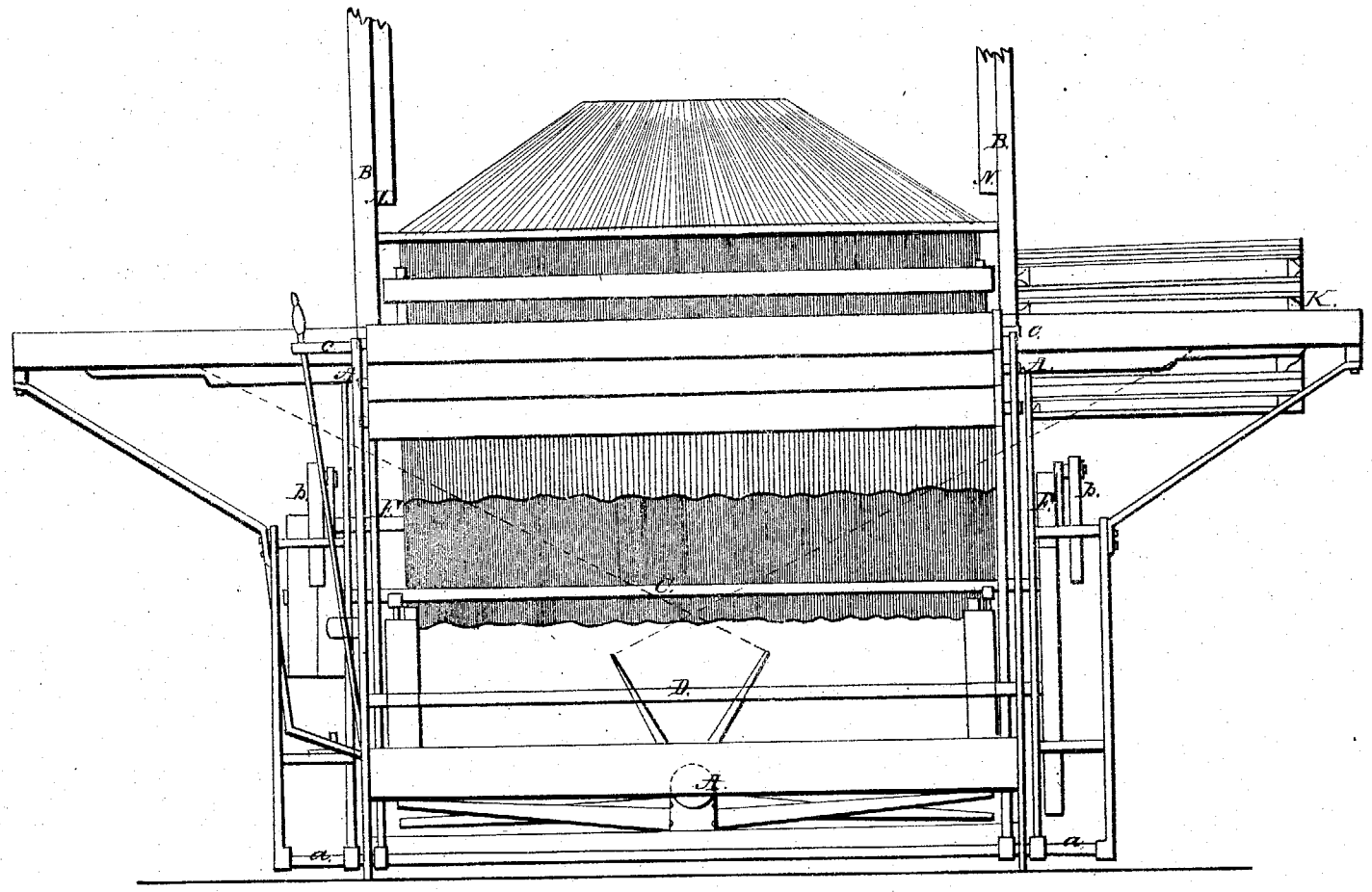

8208X
Sheet 2-3 Sheets.
J. Haight.
Loom
Patented May 17, 1834.
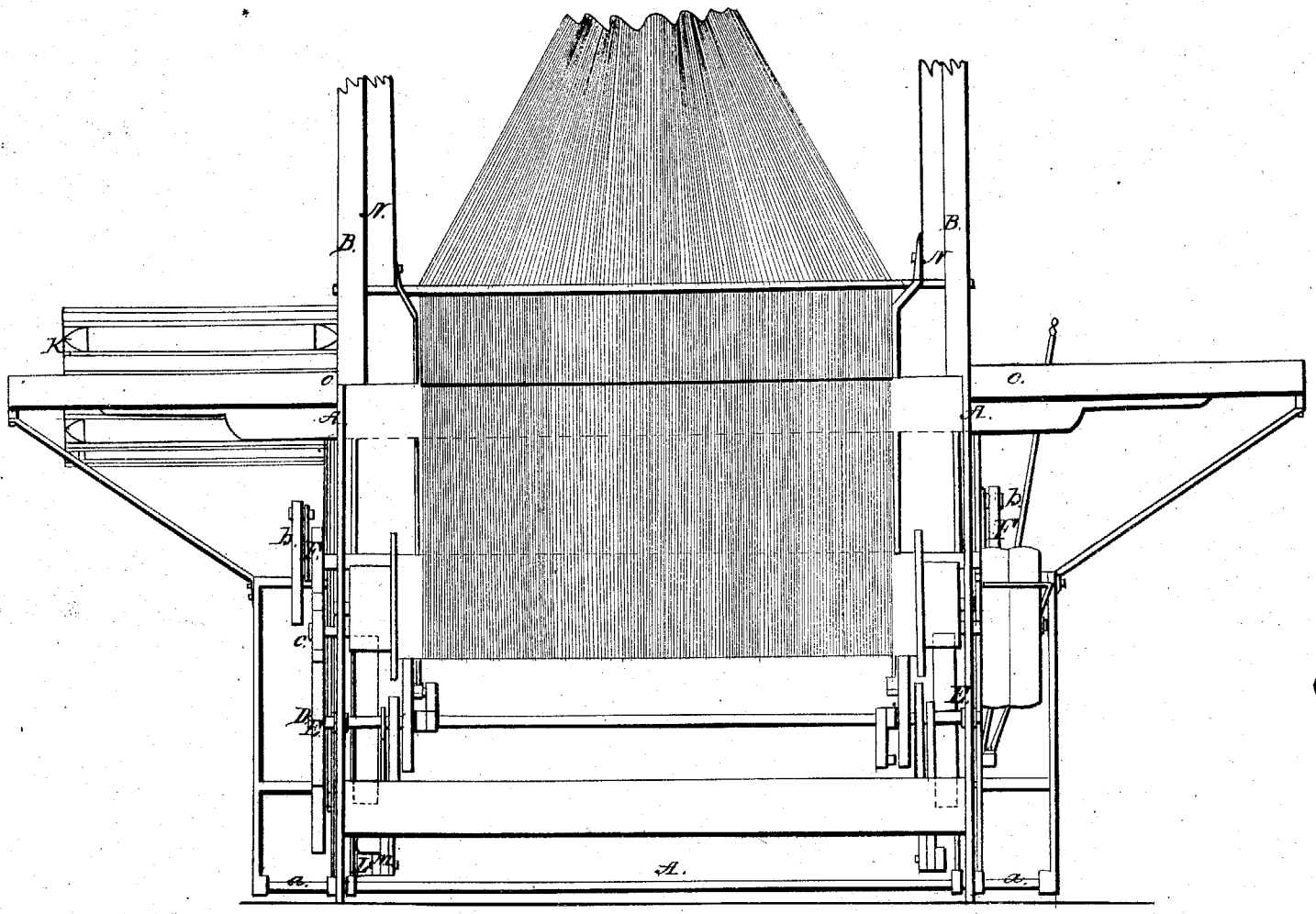

8208X
Sheet 3-3 Sheets.
J. Haight
Loom.
Patented May 17, 1834.
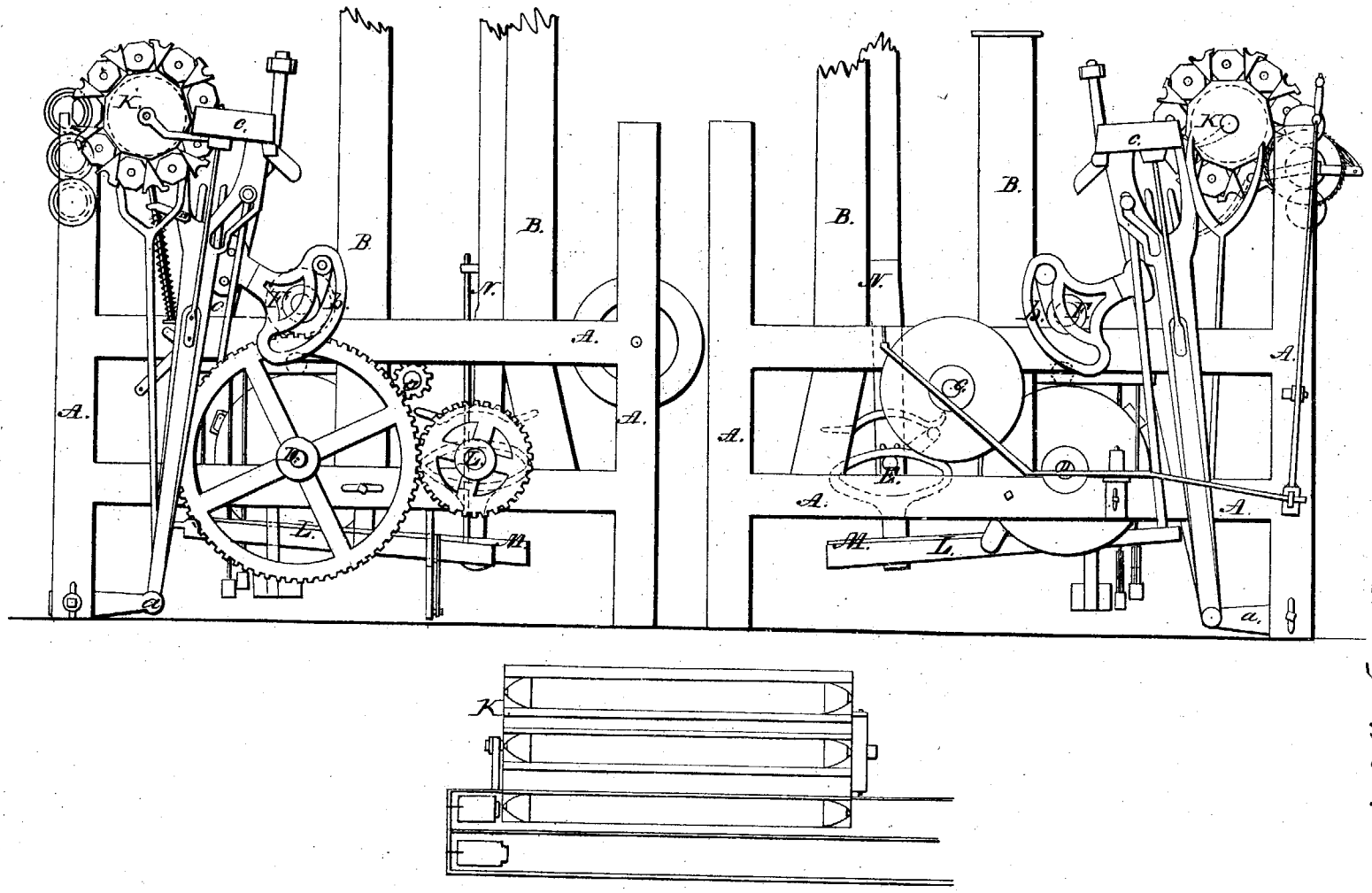
H. PETERS, PHOTO-LITHOGRAPHER, WASHINGTON, D. C.

John Haight May 17, 1834

Letters Patent

The Schedule referred to in these Letters Patent and making part of the same containing a description in the words of the said John Haight himself of his improvement in the loom for weaving carpets and other figured cloths To all to whom these presents may come Be it known that I John Haight of Harsimus in the County of Bergen and State of New Jersey have invented a new and useful improvement in the Looms for weaving carpets and other figured cloths, by which he is enabled to apply water or other power in their operation, and that the following is a full & exact description of the construction and operation of the said machine, as invented or improved by me. Note; In the following description that end of the loom on which is the driving pulleys will be called the pulley end and the opposite the gear end, that side of the loom on which the yarn beam containing the yarn or web will be called the back side and the opposite the front side, and further that as this improvement does not at all alter the engine for forming the figure except that the cam on the engine shaft works the uprights which has precisely the same effect upon the engine with the operators foot when worked by men, no description of said engine is given, as it is well known and is not altered or affected by this improvement. This machine consists of a frame four feet and two inches deep and three feet and ten inches long and three feet and three inches high and is represented on the plate by the letter A and is formed by two ends of iron or wood, the posts of which are connected by two girths, the lower one foot upwards from the foot, and the upper twenty three inches from the lower, these ends are connected and held together by beams on each end, the lower beam is placed with the top surface even with the under Drawn under side of the lower girths, and the upper beams even with the top of the posts. a slitted bearing is cast on the outer edge of the back posts twenty two inches from the foot of the posts to sustain the yarn beam, which is held in by pins and kept back by the ordinary friction strap and lever. From the bottom of each front post a stand is projected backwards six inches and bolted through a slit in the posts just above the feet to sustain the rod or shaft on which the swords of the lathe plays marked a.. Two posts are then raised from the frame to support the engine in the usual way and bolted to each girth of the frame marked B. Two stands are bolted to the under side of the upper girths fifteen inches inwards from the backside to sustain the bearings of the main shaft, which is marked C and rests upon the caps of the bearings. From the top of the lower girths twenty inches from the front side are raised two stands to sustain and form the bearings of the picker shaft marked D. and fourteen inches back of the last shaft. on the same girths are raised two stands to sustain and form the bearings of the engine shafts marked E and directly over the picker shaft two stands are raised from the upper girth to sustain and form the bearings of the crank shaft marked F. The driving shaft is then entered in its bearings having on the pulley end and outside of the frame a fast and loose pulley of eleven inches diameter and two and a half inches on the face and on the gear end a pinion of 13 teeth. The picker shafts is then placed in its bearings having near its gear end a cog wheel of 96 teeth gearing into the pinion on the main shaft or driving shaft and just within the frame on each side a pulley or blank wheel of thirteen inches diameter and two and a half on the face. These pulleys have each two staples or drivers project ing outwards one and a half inch and two & a half inches long on opposite sides of the pullies and placed near opposite ends of the pul lies to come in contact with the tricks on the picker levers hereafter described. The crank shaft marked F. is then ~~entere~~ entered in X on its bearings having on its gear end a cogwheel of 24 teeth
gearing in : to the cog wheel on the picker shaft; and on each
end a crank of 4 1/2 inches radii, or 9 inches sweep furnished with
a stud and friction pulley of 1 1/2 inch diameter. The engine shaft
marked E is then placed in its bearings having on the gear end
a cog wheel of 48 teeth gearing into wheel on the picker shaft and
just within its bearings. On each side of the frame a crank stud
slit in the ends to form a guide for an oval cam, within which
it plays on a pin or friction pulley so placed as to form a crank
of 3 inches radii. and giving the cam a motion up and down of
6 inches and serves to shift the shuttle boxes as hereafter described
Four and a half inches, inwards from these cranks on each side
is another crank stud of 5 inches radii and furnished with its
stud and friction roller, projecting outwards to raise the
section of a cam. connected with the uprights which govern
the engine and serve the purpose ^of the purpose of the treadles in the com-
mon loom The foregoing form the principle moving parts of the
loom, and the gearing mentioned has five teeth to each inch of
the diameter of the wheels and the picker shaft is marked D.
A lathe is formed by entering two swords of cast iron on their
rod or shaft within the ends of the frame and connecting
them on the top by a cross bar of wood, so that the race board
on it will be three fourths of an inch lower than the breast
beam when brought up. These swords have a hole to receive the
rod at the bottom and are slitted to receive a stud to work the
take up lever, Two and a half inches above the upper girth
they receive the stands of the cam, which gives them motion
from the crank and are firmly bolted to them. This stand is of
one piece of casting with the cam, which is a semicircular slit
corresponding to the radii of the crank and the diameter of its
friction roller and is marked B, and the lathe with which
it is connected is marked C, above these stands the swords
are slitted six inches ^upwards to receive the shifting rod hereafter
mentioned mentioned the slay or reed frame is then placed on the back
side of the frame bar of the lathe, with its end pieces projecting up-
wards eight inches to receive the top piece which is mortised
for them and the slay is received and held firm by grooves
in the bottom and top pieces in the usual way of power looms,
and the upper ends of the swords are cast with flanges to re-
ceive the cross bar and the bottom piece of the slay frame through
which they are firmly bolted at each end. Thus formed this
part constitutes the moving lathe, having an irregular but
uniform motion carrying the slay to and from the work.
Two swords are then placed upon the part of the lathe
rod just out side of the frame and rise to the same
height with the swords before mentioned and serves to sus-
tain the shuttle boxes at each end of the lathe, six
inches up from the rod, these swords is a socket guide
and nineteen inches above this it receives another for the
rod which turns the shuttle wheel hereafter mentioned,
And six inches below the last mentioned socket the
sword receives a stud for a knee which shifts the forks
of the rod before mentioned to and from each side of the
wheel which it moves together with this stud and between
it and the sword a small stand is raised and pro-
jected forwards and outwards to sustain the bottom of a
spiral spring and receive a friction nine inches above
this another stand is projected upwards and forwards
from the sword to hold the upper guide of this rod through
which it passes and is formed into a steady hammer
fitting the sides of the shuttle wheel, a spiral spring is placed
between the guides and the rod is passed down through the guides
and the spring and is held by a pin through the rod resting
upon the top of the spring so that the power of the spring is
employed to keep the shuttle box in place when it has been mov[ed]
as hereafter described. Above this last mentioned stand the
sword sword divides. the front part projects forwards one inch and upwards seven inches. the back part projects backwards five inches. and rises even with the front. and they receive upon the top on each side of the loom, a double shuttle box six inches wide and twenty five inches long having a dividing board in each in the middle, and accommodates two shuttles. A small sword is then entered on the ends of the sword rod, six inches outwards from the last and rise parallel to them two feet and are secured to them by two bolts passing through [illegible] between the swords, the lower one seven inches from the rod, the other one inch from the top. a brace is then bolted to an ear on the under side and outer end of each shuttle box and to the last mentioned sword just below the upper bolt. and thus forms a firm support for the outer ends of the shuttle boxes which are connected by a firm piece of wood passing back of the slay and cut away on the front side to give room for the front shuttle box to be brought in a line with the slay which piece of wood is bolted firmly to the back shuttle box on each side the part of the sword before mentioned projecting backwards, is slitted one and a half inch below the division perpendicularly and the projecting part is also slitted perpendicularly near the top one and a half inch. and the lower part of the top slit, and the upper part of the lower slit, are united by an angular slit all which slits are 3/4 of an inch wide and so formed that a rod passing from top to bottom, will move the sword backwards two and three quarters inches and the rod will move downwards four inches. The back division of the shuttle box on the gear end and both divisions of the shuttle box on the pulley end, are in form like the common shuttle box of power looms grooved in the bottom to guide the picker and furnished with friction springs to hold the shuttle and picker from rebounding when they arrive in their places. But as many different coloured yarns must be woven into carpets pets. and other figured goods, and as one shuttle will be required for each colour, the following apparatus is affixed to receive these shuttles and change them as the figure requires. A circular stand is bolted to the sword holding the shuttle box with the same bolt and projects forwards 3 inches and upwards one inch and a quarter. And from the under side of the shuttle box and twenty inches from the stand, a similar stand is projected to hold the shaft of an equilateral polygon marked K. and having as many sides as the number of shuttles desired (say) nine as represented on the plate which will bring every side when brought square with the bottom of the shuttle box in a line with the outside piece which with the bottom of the box is removed or left vacant the whole length of the polygon and its sides now form the side of the box. Upon each of the vertices or points of the polygon an angular piece is screwed in such a manner as to form right angles with the sides. so that when the sides form the front side of the box the angular piece will form the bottom, which must have a lip turned upwards 3/8 of an inch and 1/4 of an inch wide to hold in the truck wheel of the shuttles, and prevent its falling) out when turned downwards with the polygon. A small spring is also fixed on the outside of the angular pieces and projecting a little over the space to be occupied by the shuttle, to hold the other side of it. these angular pieces may be cut or [illegible] on the out sides to make them light and tasteful and there must be a space left between them and the dividing board of the shuttle box which forms the backside of the front box, a space to form a groove for the picker which is kept in by a clasp which slides in a flange on the under side of the box just under the dividing board. Upon the end of the polygon next the loom, a pulley is made fast having a flange on the outside of 3/4 of an inch, leaving a flange or score 3/4 of an inch deep between the flange and the end of the polygon gon, nine pins or trundles 1/4 of an inch in diameter are then
passed through the flange into the polygon, in a circle (and
at equal spaces. and in a line with the pieces forming the
bottom of the shuttle box when its shuttle is in action. The rod
which turns this polygon, is then entered in its socket near
the lower part of the sword, where it is round, and into the
upper socket where it is flat And has room to move sideways
⅛ of an inch. Above this it is forked and comes up on each
side of the pulley) last mentioned leaving a catch projecting in-
wards from each fork in such a manner that when the front
catch is [illegible] hold of pin in the pulley, the back catch will
be free, or pass its pin without a contact. and (vice versa)
A stand is then bolted to the inside of the lower girth on the gear
end fifteen inches from the front of the frame, and extends down-
wards 3½ inches where it takes a stud projecting outwards
and forms the fulcrum of a lever marked L. this lever extends
backwards of the fulcrum. fifteen inches and forward of it five
inches when a piece of iron is bolted to it, and forwards until
it comes by the side of the lower end of the rod above mentioned
where it is connected with it by a piece of iron bolted to each.
A stand is then bolted to the upright piece which works the
engine, on the gear side nine inches above the upper girth.
projecting) backwards two inches and outwards two inches.
through this stand a rod is projected downwards and made
fast with screws with the lower end directly over the back X
end of the lever last mentioned. so that when the upright
descends, this rod will strike the end of the lever and carry-
ing it down with it consequently raises the other end and
carrying with it the rod before mentioned which by the
catch of the fork which is in gear will cause the pulley to
move just one ninth part of a revolution and bring a
new shuttle in place. The catch on the front side of the
forks of the rods will always tend to be in action with the
pins pins of the pulley by the gravity of the rod. to overcome this and
bring the catch on the back fork in action. A knee is put
upon the stud before mentioned for it, on the sword which will
bring the stud on the short part of the knee, against the back
part of the rod and the long part of the knee will extend for
wards of the rod and must be weighed to overcome the gravity
of the rod & bring the catch on the back fork into contact
with the pins of the pulley which will reverse the motion of the poly
gon and turn it forwards, and bring up or back the shuttles
which have passed. But when the shuttles have all been used
and returned this knee must be raised to commence anew
which is affected by attaching a string to the needle,
which changes the apron of the engine for a new figure pas
sing it over a small pulley and attaching it to the long arm
of the knee by which it will be raised. and the catch on the
front fork will again turn the polygon and the shuttles will
be brought back again in rotation. but as some of the colours will
want to pass several times. to form the figure without changing
it will be necessary to make a number of shoots with the shut
tle. containing it before the polygon moves to change it. to ef
fect this a small stand is bolted to the lower girth of the frame,
twenty one inches from the back post and projected downward
nine inches having a stud at the lower end which receives
a knee extending inwards (fifteen inches) and upwards five
inches. - the outward part comes up close by the outside of
the lever which raises the forked rod. just forward where
the rod from the upright strikes it. and has a catch or
latch formed on the upper end projecting inwards, so that
when the lever descends, it will crowd out the upper part
of the knee by the incline of the latch until the lever is down
when the catch will be drawn over the top of the lever by
the weight of the long end of the knee, and the lever will
be held down, and the polygon will remain stationary.
and and the shuttle in the box will be worked until this latch or catch is drawn off. which is effected by attaching a string to the shifting needle of the engine and the inside end of this knee; which raises that end, and sets the lever free at every change in the figure ready to be acted upon by the next movement of the upright and bring in a new colour as before described. Having thus described the manner of shifting the shuttles. I shall next describe the manner of propelling them through the piece from side to side of the lathe, For this purpose a stand is projected downward from each of the lower girths. eight inches on the inside and are fourteen inches back from the front post to these stands at the bottom. a cross piece is bolted connecting them together. In the center of this piece. a stud is raised 5 inches from which is projected forwards a stud for 2 vibrating pullies to each of which are firmly bolted the picker rods extending upwards eighteen inches, at the top of which is affixed the pickerstrings connected in the usual way with the pickers in the shuttle boxes, to each of these pullies on the top a strap of leather is bolted which passing through the shackle on the end of the picker lever comes back and buckles near the top of the pullies. These picker levers are nineteen inches long and are sustained by studs in the cross piece last mentioned eleven inches from the pulley which form their fulcrum and have each a staple in their outer ends to receive the connecting rod which moves them. Two studs are then bolted to the upper girths seventeen inches from the back post projecting inwards four inches on each side of the frame. two levers are put upon these studs and pass forward directly over and resting upon the pullies or blank wheels on the picker shaft and extending forwards until they come directly over the staples in the picker levers where they receive each a regulating screw with an eye in the lower lower end to receive the connecting rods which are formed with a hook on each end which being entered in the staple and eye of the levers / connects them together. The levers are mortised where they rest on the blank wheels and a scored truck is fitted in them against which the staples on the blank wheel come in contact by which they are suddenly raised bringing up with them the outer ends of the picker levers and consequently turning the vibrating pulley towards the operating pulley bringing with it the picker rod and the string connecting the upper end of the rod with the picker, by which the picker will be suddenly brought against the shuttle with an impetus that will propel it to the opposite box and it will be returned in its time by the action of the staple on the blank wheel on its match lever and the shuttles in both apartments of the boxes will be worked in this manner in rotation, and the front and back shuttle boxes will require to be shifted to a proper position with the slay at each stroke of the lathe. To effect this a change rod is passed through the angular slit in the swords sustaining the shuttle boxes and through the upright slits in the swords having a uniform motion and sustaining the lathe, and when it is in the perpendicular part of the angular slit at the top of the sword, the back board of the back shuttle box will be in a line with the front of the slay and the back shuttle containing the ground colour will be in a situation to pass the piece but the other box must be moved into its place for the next shoot to make the figure. To effect this change the eye of a rod is passed round this change rod just within the inside swords, and extends downwards twenty six inches where it enters a slit in the end of a lever and is held to it by a pin passing through each part of the lever and the rod which is here made flat. This lever extends backwards fourteen inches where it receives a pin in a stand on the inside of the lower girth which serves as its fulcrum. it is is continued back until it comes directly under the engine
shaft where it receives upon it the stem of the oval cam marked
M- on which the crank stud first described on this shaft
plays. upon this cam a slitted stand is projected upwards
with its forks passing each side of the engine shaft to prevent
any lateral motion, and the crank will give the cam and
the lever an upright and descending motion as it passes its
sides carrying with it the levers and cause the rod on the other
end to rise and fall four inches forcing the change rods which
it clasps to rise and fall with it in the slits in the sword hold-
ing the lathe and as it descends it will enter the angular
slit in the sword holding the shuttle boxes and cause it to
move backwards two and three quarter inches and bring the
back board of the front shuttle box in a line with the front
of the slay. when the shuttle in that box will be ready to
pass, and this change will take place uniformly at every
shoot of the shuttle, but as the shuttle may by accident
fail to reach its place in the opposite box after receiving
its stroke, it becomes necessary in that case to prevent
the lathe from coming forward and injuring the web. For
this purpose a stand is bolted to the lower girth on the pulley
side sixteen inches back from the front post projecting out-
wards seven inches. a stud raised upwards from this
stand serves as a fulcrum to a lever to shift the driving
belt from the fast to the loose pulley. the back end of this
lever is formed into a fork which strides the belt and
moves it off and on. The front end of this lever comes
forward to the front of the frame, where it is connected with
an upright lever having its fulcrum in a slitted stud placed
about mid way up the front post, and is continued upwards
to the top of the post where it is formed into a handle, and
in a line with the under side of the breast beam [illegible] receives
by a staple and pin the rear end of the protector lever [illegible] this rod rod is held by two clasps to the breast beam. the clasp on the gear-end forms a shoulder for a spiral spring as well as for a guide to the rod. which spring covers the rod sixteen inches and is kept together by another clasp held to the rod by a sett screw so that the expansion of the spring will always tend to drive the rod endwise towards the pulley side of the frame.

The front side of this rod has a score in the middle to receive a catch to hold it against the spring when the loom is in action. This catch is sustained in two stands from the under side of the breast beam and is held up to the rod by a spiral spring in the same manner as the protection rod and is continued backwards through the stands seven inches and a half in form of a rod and is received in a hole in a stand on the middle of the lathe when it comes up to press in the weft. on the lower end of this stand is a stud projected forwards sustaining two flat pieces of iron so heavy at the lower ends. as always to keep them upright. when not acted upon and so placed as to shade or cover the hole in the stand. to the lower end of these pieces or stoppers on each side strings are fixed and connected with the picker strings in such a manner that when the shuttle has reached its place in the box. the piece of iron will be drawn with it and the hole in the stand will be unmarked and the rod will enter and the lathe will come forward. but should the shuttle stop short. the stopper will cover the hole stop the rod and compress the spring forcing the rod back will set free the catch and the spiral spring will force the protection rod towards the pulley side of the frame. and by the action of the levers instantly remove the driving belt from the fast to the loose pulley and the loom will be stopped. which may be put in motion again by pulling up the handle of the upright lever until the catch seizes the protection rod and enters the same score. To work the engine a stand is bolted on each of the upright pieces which move the engine marked N eight inches above the upper girths and turned inwards three inches and downwards fourteen inches when it is formed into the section of a circle with the ends extended in a line with its chord. and rests upon the hub of the crank stud before described as inside on the engine shaft with its centre downwards and having the same radii with the cranks which are placed on opposite sides of the shaft so that when one upright is raised the other will remain quiet and these cams or sections of circles must be so formed that the one upright will rise and come entirely down and give sufficient time for the needles of the engine to recover before the other rises. these cams and uprights will be moved alternately by the cranks, and a slitted stand is bolted to the cam striding the shaft to prevent any lateral motion ^and the motion^ of these uprights is all that works the engine and serves all the purposes of the man's foot upon the treadles, when working the common engine loom. Having now described the manner of making the cloth it remains to describe the method of taking it away as it is made, for which purpose the common ratchet wheel and pinion with their lever, and lays worked by the studs for this before mentioned on the sword of the lathe in the usual way. but instead of placing the cog wheel which gears into the pinion of the ratchet wheel on a cloth beam, I place on the middle of three rollers of any desirable diameter (say 2½ inches on the pulley end. I place these rollers in a line one above the other in front of the breast beam, having the surface of the upper roller a little higher than the top of that beam. and I gear these rollers at the gear end with even geering spur wheels. Then pass the cloth over the top roller and back between it and the middle roller then forward between the middle middle and lower roller and it will be taken away by the friction of the cloth and roller and the draw will be uniform and I avoid all the difficulties of an increasing beam. As this improvement does not at all alter the engine for forming the figure or any of its movements except that the cam on the uprights and crank on the shaft give the motion to the uprights, but as this motion is precisely the same and has the same effect upon the engine as the operators foot when worked by men, no description of said engine is given, which serves to raise the shade and form the figure, and to the invention or improvement of which I lay no claim, and the above description is for a loom where the ground colour of the carpet is one, and the shuttle containing it is thrown alternately with the shuttles in the front box containing the colours for the figure. but if any number of colours are wanted in the ground, a similar polygon with that described may be placed to the back side of the back shuttle box on the pulley end of the lathe and any number of shuttles with different colours may in like manner be worked into the ground." Many parts of the machinery above mentioned have been known and used in power looms for plain cloth, such as the cam, and crank moving the lathe, the take up motion of the ratchet wheel and others to which I lay no claim whatever. But I do specifically claim as my invention the polygon for holding and changing the shuttles. The double shuttle boxes, and manner of changing them to the slay, and the application of the cam to raise the uprights and work the engine and the general arrangement and combination of machinery by which these several movements are effected.

In testimony that the foregoing is a true and exact description of my said improvement I have hereunto set my hand and seal this 21st day of April 1834.

John Haight

Witnesses

Elisha W. [illegible]

Wm. W. Van Waggoner